United States Patent [19]

Critten et al.

[11] 4,173,149
[45] Nov. 6, 1979

[54] DIFFERENTIAL PRESSURE SENSING DEVICES

[75] Inventors: Donald L. Critten; Charles E. Bardwell, both of Luton, England

[73] Assignee: George Kent Limited, Luton, England

[21] Appl. No.: 902,224

[22] Filed: May 2, 1978

[30] Foreign Application Priority Data

May 2, 1977 [GB] United Kingdom ............... 18295/77

[51] Int. Cl.² .......................................... G01L 13/02
[52] U.S. Cl. ........................................ 73/706; 73/716; 73/720
[58] Field of Search ................. 73/706, 717, 718, 719, 73/720, 721, 722, 716

[56] References Cited

U.S. PATENT DOCUMENTS

| 3,058,350 | 10/1962 | Brown | 73/716 |
| 4,028,945 | 6/1977 | Bergamini | 73/706 |
| 4,072,058 | 2/1978 | Whitehead, Jr. | 73/720 |

*Primary Examiner*—Donald O. Woodiel
*Attorney, Agent, or Firm*—Browdy and Neimark

[57] ABSTRACT

A pressure sensing device having a separator diaphragm through which pressure is transmitted from a working fluid to a liquid within a first part of the device and a transducer for measuring the pressure of the liquid or the difference between the pressure of the liquid and the pressure of an external fluid. A pressure overload diaphragm comprises a dished plate which forms part of a side wall of the first part of the device and has an inner section of the plate extending inwardly of that part. The overload diaphragm is inflexible or substantially inflexible over a working range of differential pressures applied thereto but the inner section thereof moves outwardly of the first part of the device if the differential pressure exceeds a predetermined value. This movement of the overload diaphragm allows movement of the separator diaphragm inwardly of the first part of the device, whereupon means associated with the separator diaphragm operate to cause a resistance to further movement of that diaphragm and to prevent a further increase in pressure of the working fluid from being applied via the liquid in the first part of the device to the transducer.

16 Claims, 10 Drawing Figures

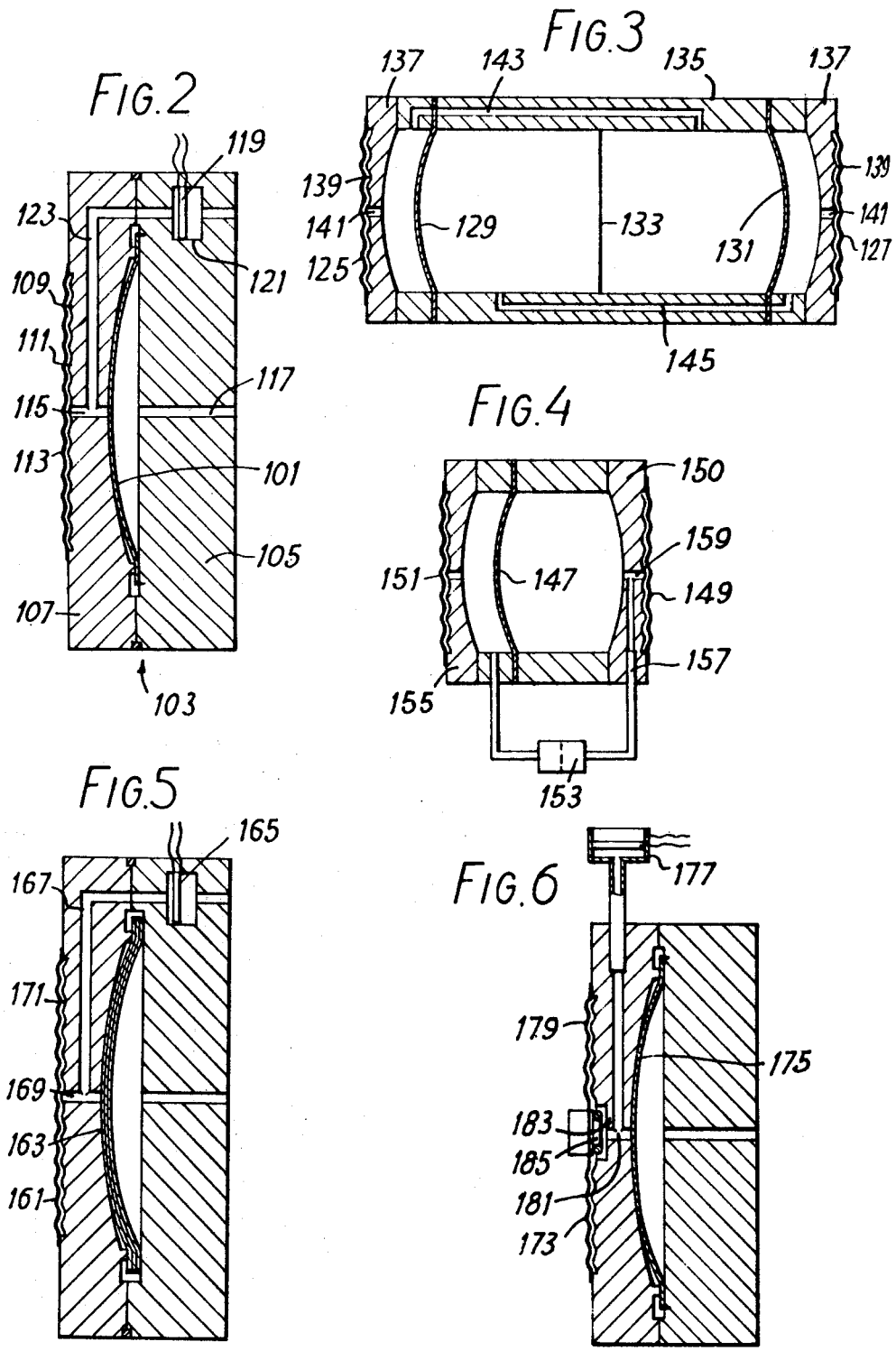

DIFFERENTIAL PRESSURE SENSING DEVICES

This invention relates to pressure sensing devices.

The present invention consists in a pressure sensing device wherein a first part of the device contains a first volume of liquid and has a side wall comprising a flexible separator diaphragm through which, in use, pressure is transmitted from a working fluid to the first volume of liquid, means are provided for sensing the pressure applied to the first volume of liquid or a difference between the pressure applied to the first volume of liquid and the pressure of a fluid outside the first part of the device, a first overload diaphragm has opposed surfaces thereof subjected to the pressure of the first volume of liquid and the pressure of the outside fluid, respectively, the said first overload diaphragm comprises a dished plate having an inner section which extends inwardly of the first part of the device relative to a peripheral section thereof, the first overload diaphragm is inflexible or substantially inflexible over a working range of differential pressures between the first volume of liquid and the said outside fluid but changes in shape when the pressure of the working fluid increases to a value such that the pressure applied to the first volume of liquid exceeds the pressure of the outside fluid by a predetermined amount, there then being a movement of the inner section relative to the peripheral section in a direction outwardly of the first part of the device sufficient to allow a movement of the separator diaphragm inwardly of the first part, and means are associated with the separator diaphragm which serve, when the diaphragm has moved inwardly by a predetermined amount, to cause a resistance to further inwards movement and to prevent any further increase in the pressure of the working fluid from being applied via the first volume of liquid to the sensing means, changes in the first volume of liquid, when the said associated means have operated, being accommodated by changes in shape of the first overload diaphragm.

A device according to the invention may be adapted to sense a static pressure, ie, a pressure developed within an enclosed fluid, or a differential pressure, ie, a difference between two pressures, one of which may be substantially equal to the other or substantially less than the other, for example a vacuum.

The invention will now be described, by way of example, with reference to the accompanying drawings, in which:

FIGS. 2 to 6 are schematic drawings of further differential pressure sensing devices according to the invention.

A first differential pressure sensing device according to the invention is used for measuring the difference between pressure of a liquid at spaced locations in a pipeline. Overload protection is provided to prevent damage if this differential pressure is exceeded. There is also compensation for changes in the volume of liquid in the device as a result of changes in ambient temperature.

Figure 1A:
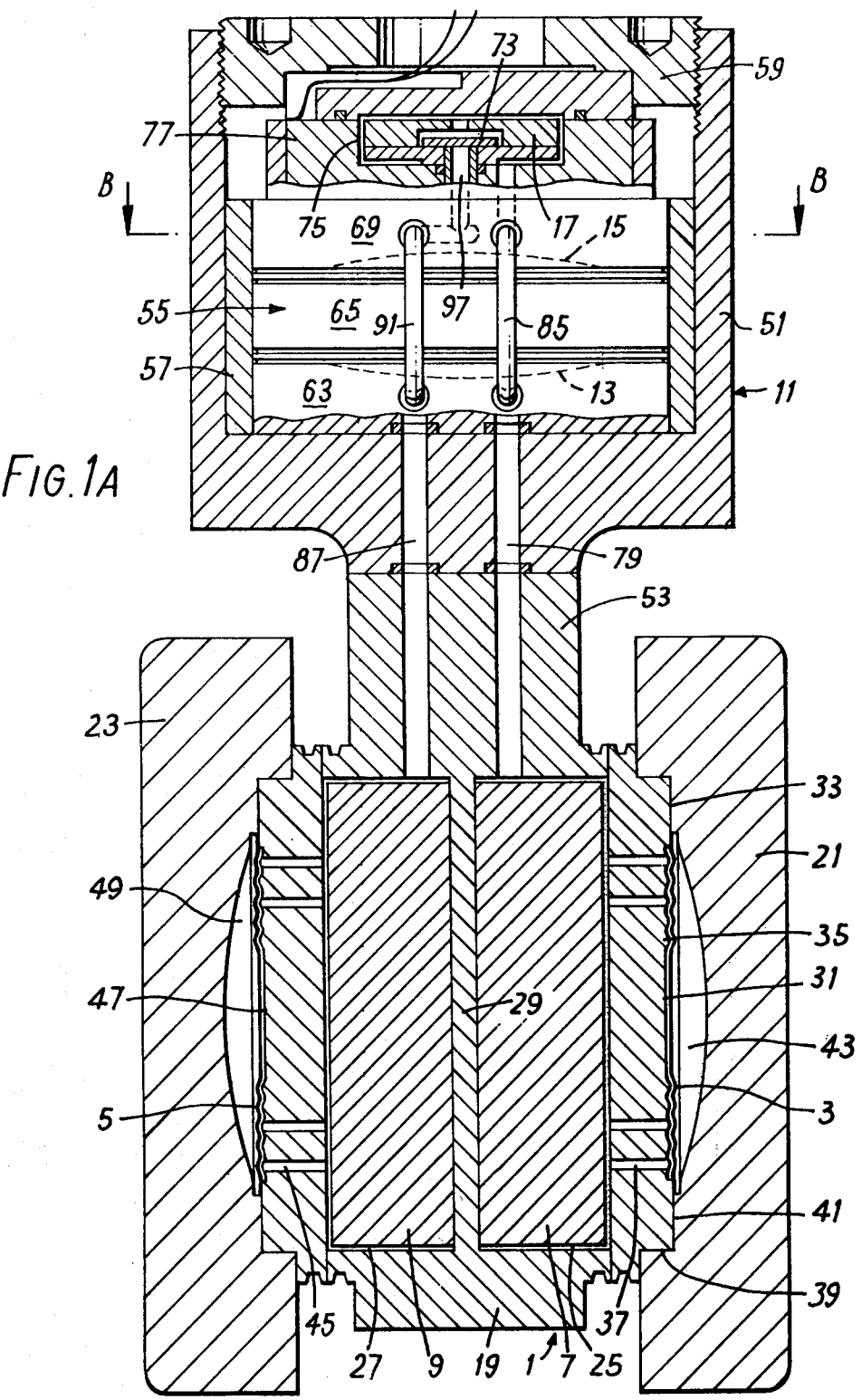
FIG. 1A is a vertical section of a first differential pressure sensing device according to the invention.
Figure 1B:
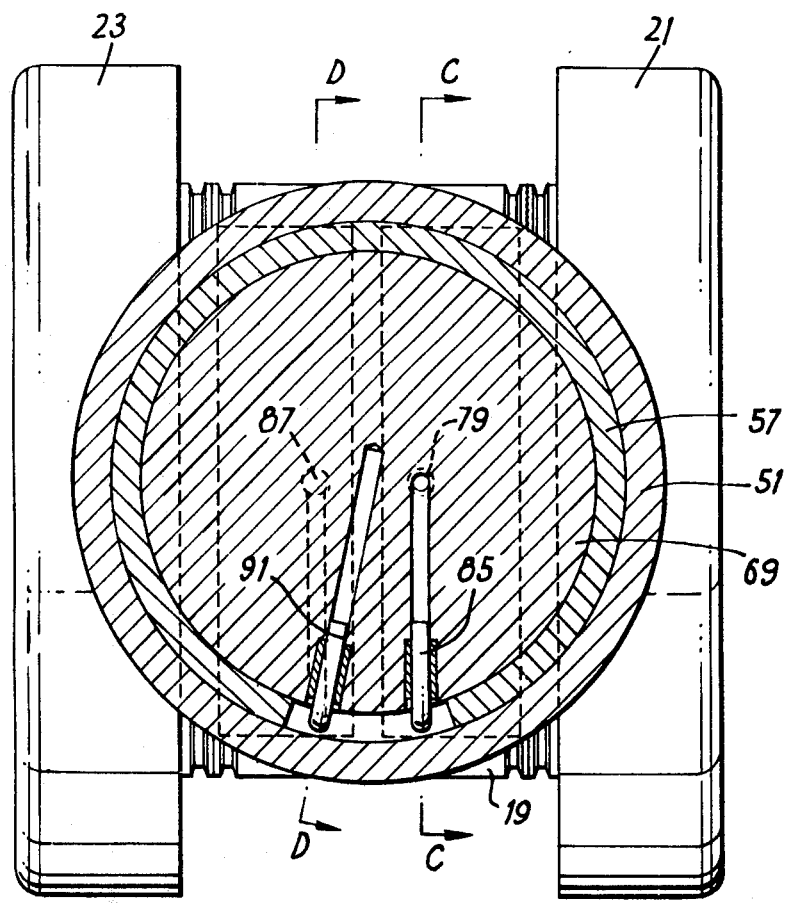
FIG. 1B is a section on the line B—B of FIG. 1A.

Referring to FIGS. 1A and B of the drawings, the present device includes a base section 1 which houses first and second separator diaphragms 3 and 5, respectively, and a pair of blocks 7 and 9 which serve as a temperature compensation device. An upper section 11 which is supported by the base section 1 contains first and second overload diaphragms 13 and 15, respectively, and a pressure sensing device 17.

The base section 1 of the present device is formed of a generally cylindrical member 19 and two end plates 21 and 23, each of which is made of stainless steel or aluminium.

Within the member 19 of the base section are two axially spaced cylindrical chambers 25 and 27, separated by a dividing wall 29. Each of the chambers 25 and 27 contains a respective one of the blocks 7 and 9, the dimensions of each block being slightly smaller than the dimensions of the chamber in which it is located so that a narrow space, of the order of 1 thou. inches, remains between the block and the side walls of the chamber. Each of the blocks 7 and 9 is formed of INVAR 36, glass or the like material having a coefficient of thermal expansion which is low compared with that of the stainless steel or aluminium from which the member 19 and end plates 21 and 23 are formed.

A central recess 31 is formed in an end face 33 of the member 19 and a series of circular ridges 35, each disposed coaxially of the member, is formed in the base of the recess. The periphery of the first separator diaphragm 3 is welded to the end face 33 and the diaphragm extends across the recess 31. The diaphragm 3 is spaced from the ridges 35 and is formed with corrugations which are disposed in register with the ridges.

The recess 31 serves as a seating surface for the diaphragm 3, as hereinafter described. Passages 37 provide communication between the chamber 25 and the space between the first separator diaphragm 3 and the bottom of the recess 31.

The end plate 21 is formed with a recess 39 and an end section of the member 19, which is formed of a reduced diameter, is fitted into this recess. The end face 33 of the member 19 engages a shoulder 41 in the recess 39 so that a cavity 43 remains between the separator diaphragm 3 and the bottom of the recess. A suitable seal (not shown) is provided between the member 19 and the end plate 21. An inlet pipe (not shown) connects the cavity 43 to one of the spaced locations in the pipeline.

At the other end of the member 19 the second separator diaphragm 5 is likewise mounted on an end face of the member 19 which is fitted into a recess in the end plate 23. Passages 45 provide communication between the second chamber 27 and the space between the diaphragm 5 and an associated seating surface 47. A second inlet pipe (not shown) connects a cavity 49 in the end plate 23 to the second location in the pipeline.

The upper section 11 of the present device includes a cylindrical housing 51 which is mounted upon a support 53 upstanding from the base section 1. The housing 51 is disposed with its axis upright, as viewed in FIG. 1A, and is formed of a base and a cylindrical side wall. An overload assembly 55 which includes a mounting sleeve 57 and the overload diaphragms 13 and 15 is fitted into the bottom of the housing 51 and the pressure sensing device 17 is clamped beween the assembly 57 and a top cap 59.

Figure 1C:
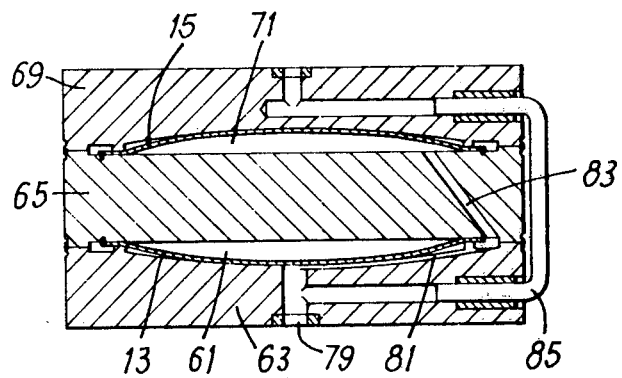
FIGS. 1C and 1D are sections on the lines C—C and D—D, respectively, of FIG. 1B.
Figure 1D:
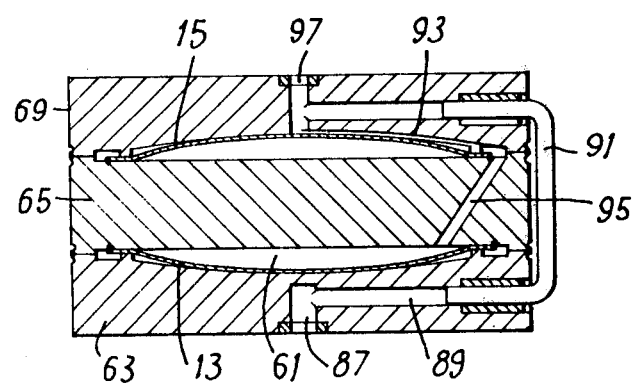
Figure 1E:
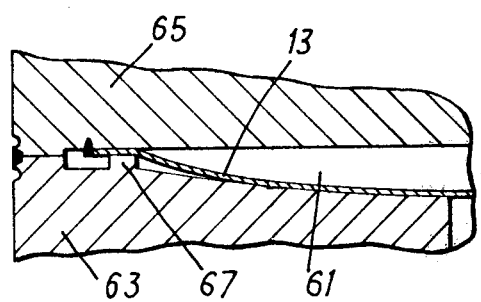
FIG. 1E is an enlarged view of part of FIG. 1C.

Referring to FIGS. 1C and 1D, each of the overload diaphragms 13 and 15 is made of a plate of stainless steel or beryllium copper or beryllium nickel. The plate is dished so as to assume a concavo-convex shape.

The first overload diaphragm 13 is engaged between a backplate 63 and a fore plate 65 which are fitted into the mounting sleeve 57 of the assembly 55. As shown in FIGS. 1C, D and E, the diaphragm 13 is arranged with its concave side facing upwardly and is disposed in a cavity formed between the fore plate 65 and a recess 61 in the back plate 63. The periphery of the diaphragm 13 is welded to the fore plate 65 and a short distance radially inwardly from the weld, the diaphragm is engaged between the fore plate and a circular ridge 67 on the back plate 63. The recess 61 is so shaped that the back plate 63 also engages the diaphragm 13 over a central region which makes up approximately two thirds of the total area of the diaphragm. The back plate 63 serves to apply a preloading to the diaphragm 13, urging the diaphragm upwardly, as viewed in FIGS. 1C, D and E and maintaining the centre of the diaphragm in a position where its displacement below the periphery is about 90% of the displacement in the absence of the back plate.

The second overload diaphragm 15 is engaged between a second back plate 69 and the fore plate 65. As shown in FIGS. 1C, D and E, the diaphragm 15 is arranged with its concave side facing downwardly and is disposed in a cavity formed between the fore plate 65 and a recess 71 in the back plate 69. The diaphragm 15 is secured and sealed to the fore plate 65 and subjected to preloading by the back plate 69 in the manner described above for the first overload diaphragm 13.

The pressure sensing device 17 includes a stress sensitive transducer 73 which is mounted inside a cavity 75 in a body 77.

The present device is formed of first and second parts which contain respective first and second volumes of a liquid such as silicone oil.

A first part of the device includes the space between the first separator diaphragm 3 and the seating surface 31, the passages 37, and the space between the block 7 and the side walls of the cavity 25 in the member 19. From the cavity 25 a passage 79 extends through the support 53 and the back plate 63 to the convex side of the first overload diaphragm 13 in the recess 61. Further passages 81 and 83 connect the passage 79 to the concave side of the second overload diaphragm in the recess 71 and a passage 85 extends from the passage 79 to an upper part of the transducer 73 via the back plate 63, the mounting sleeve 57, the back plate 69 and the body 77.

A second part of the device includes the space between the second separator diaphragm 5 and the seating surface 47, the channels 45 and the interior of the chamber 27. A passage 87 extends from the chamber 27 through the support 53 to passages 89 and 91 which are connected to the convex side of the second overload diaphragm 15. Further passages 93 and 95 connect the concave side of the first overload diaphragm 13 to the convex side of the diaghragm 15 and a passage 97 extends from the passage 91 to lower part of the transducer 73.

It will be appreciated that each of the overload diaphragms 13 and 15 forms a common wall between the first and second parts of the device.

In using the present device the inlet pipe which is connected to the first end plate 21 is connected to the first location in the pipeline so that liquid from that location is applied to the cavity 43 and to the outer surface of the first separator diaphragm 3. The inlet pipe connected to the second end plate 23 is likewise connected to the second location in the pipeline.

Each of the separator diaphragms 3 and 5 is soft, having a low spring-rate. This means that the pressure of liquid applied to each diaphragm 3 and 5 from the pipeline is transmitted via the diaphragm to the associated first or second volume of liquid on the opposite side of the diaphragm. In the result, the difference between the pressures applied to respective first and second volumes of liquid in the device is substantially equal to the difference between the pressures at respective locations in the pipeline. The differential pressure appears across each of the overload diaphragms 13 and 15 and across the transducer 73. An electrical signal representing this differential pressure is generated by the transducer 73.

As long as the differential pressure is within a predetermined working range, sufficiently low to be withstood by the sensing diaphragm, each of the overload diaphragms 13 and 15 acts as a stiff or substantially inflexible body having a high spring rate. Over this working range the full differential pressure between the two locations in the pipeline is therefore applied to the transducer 73 and the appropriate electrical signal is generated by the transducer.

This situation changes if the differential pressure exceeds the working range. Assuming there is a higher pressure at the first location in the pipeline, this higher pressure is applied via the first separator diaphragm 3 and the first volume of oil to the convex side of the first overload diaphragm 13. The lower pressure from the second location in the pipeline is applied via the second separator diaphragm 5 and the second volume of oil to the concave side of the first overload diaphragm 13. As the differential pressure increases beyond the working range there is first a gradual change in shape of the first overload diaphragm 13 and then a large change in shape which takes place over a very small change in differential pressure. The change in shape is one which involves the central section of the diaphragm 13 moving upwardly, as viewed in FIGS. 1C and D, relative to the periphery of the diaphragm, which is fixed relative to the back plate 63 and fore plate 65. The direction of movement is outwardly of the first part of the device, containing the first volume of oil, and inwardly of the second part, which contains the second volume.

In the course of this change in shape of the first overload diaphragm 13 an increased space is provided for the first volume of oil between the diaphragm and the back plate 63. Oil from the space between the first separator diaphragm 3 and the seating surface 31 flows into this increased space via the passages 37, allowing the diaphragm 3 to seat against the surface 31. Once seated, the diaphragm 3 is effectively a rigid structure which shields the first volume of oil in the device, and hence the transducer 73, from any further increase in differential pressure.

The change in shape of the first overload diaphragm 13 reduces the space within the second part of the device which contains the second volume of oil. Some of this second volume is therefore forced through the passages 45 to the space between the second separator diaphragm 5 and the seating surface 47. The second separator diaphragm 5 is bowed outwardly to accommodate the extra oil.

It will be appreciated that if the pressure at the second location in the pipeline increases to a value such that the differential pressure exceeds the predetermined value there is a similar change in shape of the second overload diaphragm 15 and seating of the second separator diaphragm 5. The transmission of the increased pressure to the second volume of oil is then prevented.

If the differential pressure is reduced to a value below the predetermined value and in the working range the separator diaphragm 3 or 5 which had seated is able to move away from the seating surface 31 or 47, impelled by the overload diaphragm. The differential pressure is then applied to the transducer 73, which again generates an electrical signal representing that differential pressure.

The presence of the blocks 7 and 9 means that an increased space is provided for oil within respective first and second parts of the device if the temperature rises. This is because the hollow cylindrical member 19 expands by a greater amount than the blocks 7 and 9. The increased space accommodates the increased volumes of oil within the device as a result of the temperature increase.

Referring to FIG. 2, a second device according to the invention includes only a single overload diaphragm 101. Overload protection is therefore provided only if the pressure on the convex side of the diaphragm is greater than the pressure on the concave side and the differential pressure is greater than a predetermined value.

The second device includes a body 103 made up of a front plate 105, a back plate 107, and an overload diaphragm 101 which is secured and sealed to the front plate 105 and engaged between this plate and the back plate 107 in the manner described above with reference to FIG. 1A to E.

In the present device the side of the back plate 107 remote from the overload diaphragm 101 is formed with a series of ridges 109 and serves as a seating surface 111 for a separator diaphragm 113, which is secured to the back plate and is normally spaced a short distance away from the ridges. A passage 115 extends from the space between the separator diaphragm 113 and the seating surface 111 to the convex side of the overload diaphragm 101. The concave side of the overload diaphragm 101 is exposed to air at atmospheric pressure, which is applied to the diaphragm via a passage 117 in the fore plate 105.

A pressure transducer 119 is mounted within a cavity 121 in the fore plate 105. One side of the cavity 121 containing the transducer 119 is connected to the passage 115 between the separator diaphragm 113 and the overload diaphragm 101 via a further passage 123 whilst the other side of the transducer is exposed to air at atmospheric pressure.

A first part of the present device is made up of the space between the separator diaphragm 113 and the seating surface 111, the passage 115, the space between the convex side of the overload diaphragm 101 and the back plate 107, the passage 123 and the adjacent space within the cavity 121. This first part of the device is filled with silicone oil. A second part of the device is made up of the space between the concave side of the overload diaphragm 101 and the fore plate 105, the passage 117 and the second side of the pressure transducer 119, all of which are open to the atmosphere.

In use, a working fluid whose pressure is to be measured is applied via piping to the outer surface of the separator diaphragm 113. The pressure of the fluid is transmitted via the diaphragm 113 to the silicone oil in the first part of the device, and thence to the convex side of the overload diaphragm 101 and to the first side of the transducer 119.

The present device oerates in the same manner as the device shown in FIGS. 1A to E if the difference between the pressure of the working fluid and atmospheric pressure is within the working range. If the pressure of the working fluid exceeds atmospheric pressure by a predetermined amount, however, the overload diaphragm 101 undergoes a rapid change in shape, its central section moving outwardly of the first part of the device. This allows the separator diaphragm 113 to seat against the seating surface 111 so that the increased pressure is not applied to the silicone oil and the transducer 119.

It will be appreciated that no overload protection is provided by the present device if the atmospheric pressure exceeds the pressure of the working fluid.

The device shown in FIG. 2 can be modified by connecting the passage 117 to the interior of a bellows. Atmospheric pressure is then applied to the second part of the device via the bellows.

The device of FIG. 2 can be converted from a differential pressure sensing device to a device for measuring a static pressure by closing the opening which connects the cavity 121 to the atmosphere and modifying the cavity so that the transducer 119 is subjected on all sides to a static pressure equal to the pressure applied to the oil in the first part of the device.

Referring now to FIG. 3, a further device according to the invention is a modification of the device shown in FIGS. 1A to E and likewise includes two separator diaphragms 125 and 127, two overload diaphragms 129 and 131 and a pressure transducer including a pressure sensing diaphragm 133. In the device of FIG. 3, however, all of these components are contained in a single enclosure.

The enclosure of the third device is formed of a hollow cylindrical body 135 of stainless steel which has an end cap 137 fitted to each end thereof. Each end cap 137 has an axially outer surface 139 which is recessed and ridged, as described above, and has a respective one of the separator diaphragms 125 and 127 secured thereto. An axial bore 141 extends through each cap 137.

Within the hollow interior of the stainless steel body 135 there is first the pressure sensing diaphragm 133 which is located midway between the two end caps 137 and extends across the body, substantially perpendicular to the axis thereof. Coupled to the sensing diaphragm 133 is a stress-sensitive transducer (not shown).

Near to each end of the hollow body 135 there is a respective one of the overload diaphragms 129 and 131 of the form described above. Each overload diaphragm is concavo-convex, has its perpheral section clamped between the associated end cap 137 and the adjacent end of the hollow body 135, and has its convex side adjacent to the end cap.

In the present device a passage 143 in a side wall of the hollow body 135 extends from the space between a first end cap 137 and the convex side of the first overload diaphragm 129 to the space between the sensing diaphragm 133 and the concave side of the second overload diaphragm 131. A similar passage 145 extends from the space between a second end cap 137 and the convex side of the second overload diaphragm 131 to the space between the sensing diaphragm 133 and the concave side of the first overload diaphragm 129.

The present device again contains two parts, each filled with a respective volume of oil. The first volume of oil fills the space between the first separator diaphragm 125 and the recessed section of the first end cap 137, the bore 141 in the first end cap 137, the space between the first end cap 137 and the first overload diaphragm 129 and the space between the sensing diaphragm 133 and the second overload diaphragm 131, and the passage 143. The second volume of oil fills the spaces between the second end cap 137 and the second separator and overload diaphragms 127 and 131, respectively, the space between the sensing diaphragm 133 and the first overload diaphragm 129, and the associated passage 145.

The device shown in FIG. 3 is connected to a pipeline so that liquid from respective first and second locations is applied to the outside of the separator diaphragms 125 and 127. In use, the pressure of liquid at the first location in the pipeline is transmitted via the first separator diaphragm 125 to the first volume of oil in the device and the pressure at the second location is transmitted via the second separator diaphragm 127 to the second volume of oil. The differential pressure appears across the sensing diaphragm 133 and the associated transducer provides an electrical signal representing the magnitude of the differential pressure over a working range of differential pressures. If the differential pressure exceeds a predetermined value the overload diaphragm 129 or 131 which has the higher pressure applied to its convex side undergoes a rapid change in shape, as described above. The associated separator diaphragm 125 or 127 then seats on the end cap 137 adjacent thereto, preventing the increased differential pressure from being applied to the sensing diaphragm 133. Oil from the space between the overload diaphragm 129 or 131 which changes shape and the sensing diaphragm 133 is expelled via one of the passages 143 and 145 to the space between the other overload diaphragm 131 or 129 and the adjacent end cap 137. Oil is then urged through the bore 141 in this other end cap and forces the adjacent separator diaphragm 127 or 125 outwardly.

The device of FIG. 3 may also be provided with blocks of invar, glass or the like material to compensate for changes in the volumes of oil when the temperature increases.

The device shown in FIG. 4 is similar to the device of FIG. 2 in that there is only a single overload diaphragm 147. In the device of FIG. 4, however, a second separator diaphragm 149 is provided on an end cap 150 at the end of the body remote from a first separator diaphragm 151. One side of an external pressure transducer 153 is connected to the space between the convex side of the overload diaphragm 147 and a first end cap 155 and the other side of the transducer 153 is connected via a radial passage 157 in the second end cap 150 and an axial bore 159 to the space between the end cap 150 and the second separator diaphragm 149 and to the space between the end cap 150 and the concave side of the overload diaphragm 147.

FIG. 5 of the drawings shows a device similar to the device shown in FIG. 2 in that there is only a single separator diaphragm 161 and a single overload diaphragm 163. A pressure transducer 165 has one side thereof connected via passages 167 and 169 to the convex side of the overload diaphragm 163 and to the space between the separator diaphragm 161 and an associated seating surface 171. A second side of the transducer 165 and the concave side of the overload diaphragm 163 are exposed to atmospheric pressure.

In the present device the overload diaphragm 163 is made up of three dished plates which are coaxially disposed and welded together at their peripheries. Each of the three plates is in contact with the or each adjacent plate over a major part of its surface area.

The effect of providing three plates for the overload diaphragm 163 is to distribute the forces arising from the differential pressure over the three plates. Each plate has to be subjected to a critical load before it changes shape in the manner described above. This means that the diaphragm 163 can withstand a predetermined differential pressure which is approximately three times as large as the differential pressure of predetermined value required to change the shape of each individual plate.

It will be appreciated that the diaphragm 163 of FIG. 5 can be replaced by a diaphragm made up of two, four or more dished plates.

In Fig. 6 of the drawings there is a device having a single separator diaphragm 173, a single overload diaphragm 175 and an external pressure sensing device 177.

Instead of the seating surface shown for each separator diaphragm in FIGS. 1 to 5, however, the diaphragm 173 has an associated back surface 179 which is spaced from the diaphragm by an amount greater than the spacing between each of the diaphragms of FIGS. 1 to 5 and the associated seating surface. A passage 181 extends from the back surface 179 to the convex side of the overload diaphragm 175 and a valve seat 183 is formed at the inlet to the passage 181 which is adjacent to the separator diaphragm 173. A valve member 185 is connected to a central part of the diaphragm 173.

In use, the device shown in FIg. 6 operates in the manner described above until the differential pressure is sufficient to cause the overload diaphragm 175 to change shape. When this happens the space available for oil in a first part of the device is increased and oil flows through the passage 181 from the space between the surface 179 and the separator diaphragm 173 to the convex side of the overload diaphragm 175. This allows the separator diaphragm 173 to move inwardly of the first part of the device until the valve member 185 engages the valve seat 183. Engagement between the member 185 and the seat 183 causes a small volume of oil to be trapped between the separator diaphragm 173 and the back surface 179. Moreover, there is no longer any communication between the oil between the diaphragm 173 and the surface 179 and the oil which contacts one side of the pressure sensing device 177. This means that a differential pressure in excess of a predetermined value cannot be applied to the transducer 177.

In a modification of the device shown in FIG. 6 the valve member 185 is not mechanically coupled to the separator diaphragm 173. Instead, the valve member is arranged in a guideway which constrains movement of the member to a direction generally perpendicular to the back surface 179. The valve member is then drawn into engagement with the associated valve seat by the reduced pressure produced on the convex side of the overload diaphragm when the diaphragm changes shape.

In each of the devices described above the or each overload diaphragm is part-spherical in shape. As an alternative, opposed surfaces of the or each overload diaphragm may be generally conical.

A range of devices according to the invention have overload diaphragms whose dimensions are designed to suit the maximum differential pressure which the associated pressure transducer can withstand. For devices having two overload diaphragms, each of 1½ inches diameter, the following relationships between the thickness, t, of the plate from which the diaphragm is formed and the displacement, d, of the centre of the diaphragm relative to a plane containing the periphery is as follows:

| Full range of operation (p.s.i.) | t (thou. ins) | d (thou. ins) | Maximum pressure which can be applied to transducer (p.s.i.) |
| --- | --- | --- | --- |
| 1 | 5 | 40 | 8 |
| 4 | 7 | 40 | 16 |
| 16 | 10 | 40 | 32 |
| 56 | 16 | 40 | 112 |

It will be noted that the centre of each diaphragm is displaced relative to the periphery by an amount which is between 2½ and 8 times the thickness of the diaphragm.

We claim:

1. A pressure sensing device wherein a first part of the device contains a first volume of liquid and has a side wall comprising a flexible separator diaphragm through which, in use, pressure is transmitted from a working fluid to said first volume of liquid, sensing means are provided for sensing pressure applied to said first volume of liquid or a difference between the pressure applied to said first volume of liquid and pressure of a fluid outside said first part of the device, a first overload diaphragm has opposed surface thereof subjected to the pressure of the first volume of liquid and the pressure of the outside fluid, respectively, said first overload diaphragm comprises a dished plate having an inner section which extends inwardly of said first part of the device relative to a peripheral section thereof, said first overload diaphragm is inflexible or substantially inflexible over a working range of differential pressures between said first volume of liquid and the outside fluid but becomes flexible and changes in shape when the pressure of the working fluid increases to a value such that the pressure applied to said first volume of liquid exceeds the pressure of the outside fluid by a predetermined amount, there then being a movement of said inner section relative to said peripheral section in a direction outwardly of said first part of the device sufficient to allow a movement of said separator diaphragm inwardly of said first part, and means are associated with said separator diaphragm which serve, when said separator diaphragm has moved inwardly by a predetermined amount, to cause a resistance to further inwards movement and to prevent any further increase in the pressure of the working fluid from being applied via said first volume of liquid to said sensing means, changes in said first volume of liquid, when the said associated means have operated, being accommodated by changes in shape of said first overload diaphragm.

2. A pressure sensing device as claimed in claim 1, wherein the said outside fluid is a second volume of liquid which is contained in a second part of the device, the second part of the device has a side wall comprising a flexible element through which, in use, pressure is transmitted from a working fluid to the second volume of liquid, and the first overload diaphragm is comprised in a common wall between the first and second parts of the device.

3. A pressure sensing device as claimed in claim 2, wherein the flexible element is a second separator diaphragm, means are associated with the second separator diaphragm which, when the diaphragm has been caused to move inwardly of the second part of the device by a predetermined amount, serve to cause a resistance to further inwards movement, a further common wall between the two parts of the device comprises a second overload diaphragm which comprises a dished plate having an inner section which extends inwardly of the second part of the device relative to a peripheral section thereof, the second overload diaphragm is inflexible or substantially inflexible over a working range of differential pressures between the first and second volumes of liquid but changes shape when the pressure of the second volume of liquid exceeds the pressure of the first volume of liquid by a predetermined amount, there then being a movement of the inner section relative to the peripheral section in a direction outwardly of the second part of the device sufficient to allow movement of the second separator diaphragm inwardly of the second part of the device.

4. A pressure sensing device as claimed in either claim 1 or 2, wherein the or each overload diaphragm has an associated backing plate which engages a central section of the diaphragm, applies a preloading force to the diaphragm, and maintains the central section at a location outwardly of the associated first or second part of the device relative to the location assumed by the section in the absence of the backing plate.

5. A pressure sensing device as claimed in claim 4, wherein the or each backing plate has a central section which corresponds in shape to that of the central section of the associated overload diaphragm and contacts the diaphragm over an area equal to or substantially equal to two thirds of the area of the diaphragm.

6. A pressure sensing device as claimed in claim 4, wherein the or each backing plate serves to maintain the centre of the associated overload diaphragm at a location such that the centre is displaced relative to the periphery of the diaphragm in a direction inwardly of the associated first or second part of the device by an amount equal or substantially equal to ninety percent of the displacement in the absence of the backing plate.

7. A pressure sensing device as claimed in claim 4, wherein the or each overload diaphragm has an associated fore plate which is disposed on the opposite side of the diaphragm to the associated backing plate, the diaphragm being welded along a pheripherally extending part thereof to the fore plate and being engaged by a ridge on the backing plate over a narrow area which extends generally parallel with the weld and is disposed inwardly thereof relative to the centre of the diaphragm.

8. A pressure sensing device as claimed in either claim 1 or 2, wherein the or each overload diaphragm comprises a plurality of dished plates which are coaxially disposed, have their peripheries welded together, and are shaped and arranged so that the or each adjacent pair of diaphragms have adjacent surfaces in contact with one another.

9. A pressure sensing device as claimed in either claim 1 or 2, wherein the or each overload diaphragm has concave and convex surfaces which are part-spherical.

10. A pressure sensing device as claimed in either claim 1 or 2, wherein the or each overload diaphragm has opposed faces which are generally conical.

11. A pressure sensing device as claimed in either claim 1 or 2, wherein the inner section of the or each overload diaphragm is displaced relative to the peripheral section in a direction inwardly of the associated first or second part of the device by an amount which is between 2½ and 8 times the thickness of the diaphragm.

12. A pressure sensing device as claimed in either claim 1 or 2, wherein the means associated with the or each separator diaphragm is a seating surface which is disposed in the associated first or second part of the device adjacent to the separator diaphragm, movement of the separator diaphragm by the said predetermined amount causes the diaphragm to engage the associated seating surface, and engagement between the diaphragm and the seating surface prevents any further increase in the pressure of the associated working fluid being applied to the associated first or second volume of liquid.

13. A pressure sensing device as claimed in either claim 1 or 2, wherein the means associated with the or each separator diaphragm comprises a back surface which is disposed in the associated first or second part of the device adjacent the separator diaphragm, a passage having an inlet formed in the back surface and providing communication between the separator diaphragm and the associated overload diaphragm and and the pressure sensing means over the working range of differential pressure, a valve seat formed at the inlet to the passage, and a valve member which is caused to move into engagement with the valve seat to close the passage when the diaphragm has moved by the said predetermined amount, a part of the associated first or second volume of liquid then being trapped between the separator diaphragm and the back surface.

14. A pressure sensing device as claimed in claim 13, wherein the or each valve member is mechanically coupled to the associated separator diaphragm.

15. A pressure sensing device as claimed in either claim 1 or 2, wherein the or each part of the device comprises a hollow body having an external part formed of a first material and an internal part formed of a second material whose coefficient of thermal expansion is substantially lower than the coefficient of thermal expansion of the first material, and at least part of the first or second volume of liquid is disposed in the space between the external and internal parts of the associated body, differential expansion between the first and second materials providing an increased capacity within the body when an increase in temperature causes expansion of the first or second volume of liquid.

16. A pressure sensing device as claimed in claim 3, wherein the first and second separator diaphragms are coaxially arranged and are disposed at or near respective opposite ends of a base section of the device, the first and second overload diaphragms are coaxially arranged and are disposed in a further section which is secured to the base section so that a common axis of the separator diaphragms is perpendicular to a common axis of the overload diaphragms, and the pressure sensing means are disposed in the said further section on the side of the overload diaphragms remote from the base section.

* * * * *

UNITED STATES PATENT AND TRADEMARK OFFICE
CERTIFICATE OF CORRECTION

PATENT NO. : 4,173,149
DATED : November 6, 1979
INVENTOR(S) : CRITTEN et al

It is certified that error appears in the above-identified patent and that said Letters Patent are hereby corrected as shown below:

Column 9, line 29, delete "pressure applied to said"

Column 9, line 30, delete "first volume of liquid or"

Column 9, line 33, replace "surface" by "surfaces"

Signed and Sealed this

Twenty-sixth Day of May 1981

[SEAL]

Attest:

RENE D. TEGTMEYER

Attesting Officer

Acting Commissioner of Patents and Trademarks